United States Patent [19]

Fox

[11] 4,349,945
[45] Sep. 21, 1982

[54] MULTI-PURPOSE POWER TOOL

[76] Inventor: Anthony Fox, 8306 Queen Ave. South, Minneapolis, Minn. 55431

[21] Appl. No.: 170,773

[22] Filed: Jul. 21, 1980

[51] Int. Cl.³ .......................... B23P 23/02; B23Q 1/14
[52] U.S. Cl. .................................... 29/27 A; 29/26 A; 82/34 R; 144/1 R; 408/20
[58] Field of Search ................ 29/26 A, 26 R, 27 R, 29/560, 57, 27 A; 408/20; 144/92, 1 R; 82/34 R

[56] References Cited

U.S. PATENT DOCUMENTS

| | | | |
|---|---|---|---|
| 2,619,135 | 11/1952 | Callaway | 408/20 X |
| 2,623,269 | 12/1952 | Goldschmidt | 408/20 X |
| 2,661,037 | 12/1953 | McGihon | 408/20 X |
| 2,835,289 | 5/1958 | Rockwell | 408/20 X |
| 2,905,211 | 9/1959 | Weinstein | 408/20 X |
| 2,927,612 | 3/1960 | Edgemond, Jr. et al. | 144/1 |
| 3,387,638 | 6/1968 | West | 408/20 X |
| 3,410,326 | 11/1968 | Paquin | 408/20 X |

FOREIGN PATENT DOCUMENTS

2025282  1/1980  United Kingdom ............... 29/27 A

Primary Examiner—William R. Briggs
Attorney, Agent, or Firm—Orrin M. Haugen; Thomas J. Nikolai

[57] ABSTRACT

A multi-purpose power tool in which a power head and a power carriage are mounted for reciprocal translation on a pair of elongated tubular ways, the ways being pivotally mounted and counterbalanced with respect to a generally horizontal base or stand such that the power head and carriage may be moved independently in a horizontal plane or, alternatively, in a vertical plane. The power head and carriage assemblies may be moved in a precise manner relative to the ways, either manually or by means of a variable speed motor drive. Included within the power head is an arbor assembly which passes through a quill member, the arbor also being driven by a variable speed motor. The quill assembly is provided with means for moving same outwardly from the power head to a desired extent and for subsequently locking it in that position. The carriage assembly includes means for supporting and accurately positioning a work holding table. By properly choosing the tool elements to be mounted on the arbor, the multi-purpose power tool can be made to function as a table saw, a disc sander, a vertical drill press, a lathe, a horizontal boring machine, a horizontal or vertical milling machine, a stationary adjustable router or a high speed shaper.

7 Claims, 12 Drawing Figures

MULTI-PURPOSE POWER TOOL

BACKGROUND OF THE INVENTION

I. Field of the Invention

This invention relates generally to power tool apparatus and more specifically to a universal, multi-purpose power tool specifically designed so that with only modest set-up times, it can be made to function in a wide range of capacities, normally carried out by plural separate single-purpose power tools.

II. Discussion of the Prior Art:

In the Goldschmidt U.S. Pat. No. 2,623,269 there is described a convertible power tool which may be set up to function as any one of a plurality of material working tools, such as a drill press, table saw, lathe or sander. The present invention is deemed to be a significant improvement over that design in at least the following respects:

(1) Ease of set-up;
(2) Degree of precision attainable;
(3) Flexibility of use;
(4) Variability in rotary tool speed;
(5) Motor driven power carriage control;
(6) Vernier control on power carriage motion;
(7) Positive locking of power head and power carriage;
(8) Ability to accommodate workpieces of varying sizes and lengths.

The device of the Goldschmidt Patent, for example, does not provide motor powered translation of either its headstock or the workpiece supporting carriage and, accordingly, that device cannot function as a vertical or horizontal milling machine or as a boring machine. Further, the overall construction of the device reflected in the Goldschmidt Patent seriously limits the precision with which workpieces can be machined or shaped. Specifically, because the locking arrangements by which the headstock and carriage are secured to the ways do not afford a sufficient degree of rigidity to preclude misalignment and movement due to vibration and the like.

Also inhibiting the flexibility and ease of use of the prior art Goldschmidt tool is the fact that in converting the machine between a horizontal and a vertical orientation, no means are provided for counterbalancing the parallel ways and, accordingly, the operator must lift or support the entire weight in moving the ways from the horizontal to the vertical and vica versa.

The design of the present invention obviates most of the foregoing drawbacks of the prior art. Specifically, positive, two-point locking is provided between the power head and its cooperating ways as well as between the power carriage and the ways. Further, in the device of the present invention a counterbalance in the form of a heavy coil spring is provided which facilitates the repositioning of the ways between the horizontal and the vertical. Further, by providing a power drive on the tool supporting carriage and by providing a precise vernier control over the carriage drive motor rotational speed, it is possible to advance a workpiece towards a stationary cutting tool at a wide range of rates ranging from fractions of inches per second on up. As such, through proper selection of the cutting tool, the universal power tool of the present invention can be made to function as either a milling or a boring machine, thereby expanding the adaptability of the tool over the prior art as represented by the Goldschmidt Patent.

SUMMARY OF THE INVENTION

The various features and advantages set out above are achieved, in accordance with the present invention, by providing a high quality, precision tolerance, rugged universal power tool which comprises a base or stand dimensioned such that when the operative portions of the power tool are disposed thereon, the working areas are conveniently located in terms of height or elevation to suit most operators. The base or stand includes one or more drawers for storing various accessories and tool elements when not in use. Located on the upper horizontal surface of the base and proximate one end thereof is a support stand with means thereon for receiving and holding a tailstock assembly.

Also affixed to the upper surface of the base or stand at the opposite end is a bracket which pivotally supports a cross-member which is secured to a pair of tubular ways. Because of the pivotal connection, the tubular ways may extend horizontally, parallel to the upper surface of the base or stand with one end thereof resting upon the support stand or, alternatively, the tubular ways may be positioned in a generally vertical orientation.

One of the ways is provided with a gear rack and the ways pass through and support a power head assembly as well as a carriage assembly. Disposed within the power head is a variable speed drive motor which is coupled via a suitable transmission to an arbor which extends through a quill and provides a rotating member on which may be coupled a chuck or other suitable tool holding device. The power head further includes both manual and motor powered means for repositioning the power head along the tubular ways. Hence, when the ways are in a generally horizontal orientation with respect to the base or stand, the power head may be moved to the left or right, either manually or under power from an electric motor.

The carriage assembly is likewise mounted on the tubular ways and includes a variable speed motor which is coupled through a transmission to the rack gear on one of the ways and which can be engaged to translate the carriage assembly. Both the power head and the carriage assembly also include suitable safety locking arrangements for maintaining the devices in a fixed relationship with respect to the tubular ways.

To facilitate elevating the tubular ways along with the power head and power carriage assembly affixed to them from a horizontal to a vertical orientation and vice versa, the pivot stand include a torsion spring arrangement which functions as a counterbalance. The power carriage assembly includes receptacles for holding adjustable steel table guide pins which, like the tubular ways, include a gear rack for permitting a manually driven gear to reposition the table relative to an upper carriage surface.

Depending upon the tool accessories being employed with the rotating arbor of the power head, the universal power tool of the present invention can be operated as a table saw, a disc sander, a vertical drill press, a lathe, a horizontal or vertical milling machine, a boring tool, a router or a high speed shaper. In addition, other accessories may be designed and joined to the basic unit described herein via its power takeoff so that the functions of a joiner and planar can also be realized.

OBJECTS

It is accordingly the principal object of the present invention to provide a new and improved multi-purpose shop tool for woodworking and metal working applications.

It is a further object of this invention to provide a multi-purpose shop tool having manually or electrically operated controls for accurately positioning a workpiece relative to a tool surface.

Another object of the invention is to provide in a single assembly a universal, multi-purpose power tool for permitting cutting, grinding, drilling and shaping operations on a variety of materials including wood, metal and plastic.

A still further object of the invention is to provide a new and improved multi-purpose power tool which may be quickly and easily converted to perform a variety of shop functions.

A still further object of the invention is to provide a universal, multi-purpose power tool in which precise control may be maintained over the rotational speed of the work tool and the translational speed of the workpiece with respect to the working tool.

These and other objects and advantages of the present invention will become apparent to those skilled in the art from the following detailed description of a preferred embodiment, when considered in conjunction with the accompanying drawings in which like numerals in the several views refer to corresponding parts.

DETAILED DESCRIPTION OF THE PREFERRED EMBODIMENT

Figures 1, 2:
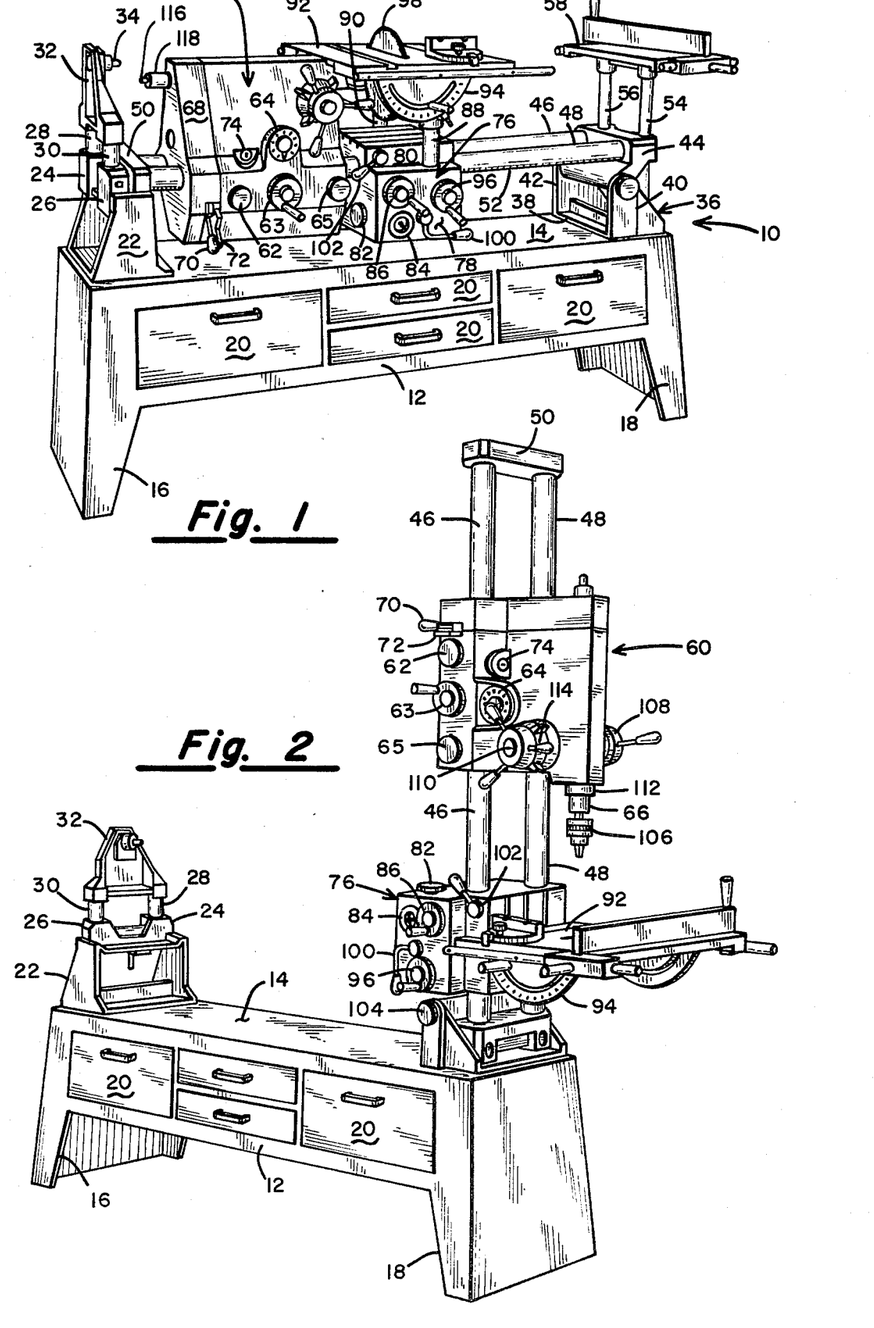
FIG. 1 is a perspective view of the preferred embodiment when configured to function as a table saw, the axis of rotation of the saw blade being in generally horizontal plane.
FIG. 2 is a perspective view of the preferred embodiment when configured to function as a drill press with the axis of rotation of the drill bit being in a vertical orientation.

Referring now to FIG. 1, there is indicated generally by numeral 10 the multi-purpose power tool comprising the preferred embodiment of the present invention. The power tool 10 includes a base or stand member 12 having a generally horizontal top surface 14 and downwardly depending leg members 16 and 18. While not shown, the stand 12 may be mounted on casters to facilitate repositioning of the assembly within the work room. The base 12 further includes a plurality of drawers as at 20 for storing various tools and accessories which may be utilized for performing various work operations.

Shown affixed to the lefthand end of the surface 14 when viewed as in FIG. 1 is a support stand 22 having support studs 24 and 26 affixed thereto in a spaced apart relationship, the support studs including vertical bores for receiving tubular pins 28 and 30 which are arranged to depend from one of a variety of accessory attachments. In FIG. 1 the accessory attachment is shown to comprise a tailstock member 32 which is shown as including a so-called Morris taper tailstock center element 34. It should be understood, however, that other devices may be attached to the support stand 22 by means of adjustment pins entering into the bores contained within the support studs 24 and 26.

Attached to the opposite end of the table surface 14 is a pivot stand member 36 which includes a base 38 and spaced apart, integrally formed side walls 40 and 42. Mounted for rotation about a horizontal axis between the side walls 40 and 42 of the pivot stand 36 is a pivot block 44, the details of which will be set out with greater particularity hereinbelow. Suffice it for now, the pivot block 44 includes first and second sets of cylindrical bores oriented generally at right angles with respect to one another. Fitted into a first set of bores are the ends of tubular way members 46 and 48. These tubular members are maintained in a parallel and spaced apart relationship by virtue of a tube spacer member 50 secured to the other end of the ways. At least one of the ways, such as way 46, is provided on its undersurface with indentations forming a gear rack 52 which extends substantially the entire length thereof.

The remaining set of tubular bores formed in the pivot bar 44 are adapted to receive the tubular pins 54 and 56 which, in FIG. 1, support an extension table 58.

With continued reference to FIG. 1, numeral 60 generally identifies a so-called power head assembly which, too, will be described in greater detail hereinbelow. The ways 46 and 48 pass through the power head assembly 60 and means are provided for moving the power head along the ways. More specifically, there is provided a manually operable power head adjustment knob 62 which is coupled through a suitable gear train so as to cooperate with the gear rack 52 disposed on the undersurface of the way 46. By rotating the knob 62, the power head 60 may be made to move back and forth along the parallel, spaced apart ways 46 and 48.

Figures 5, 5A:
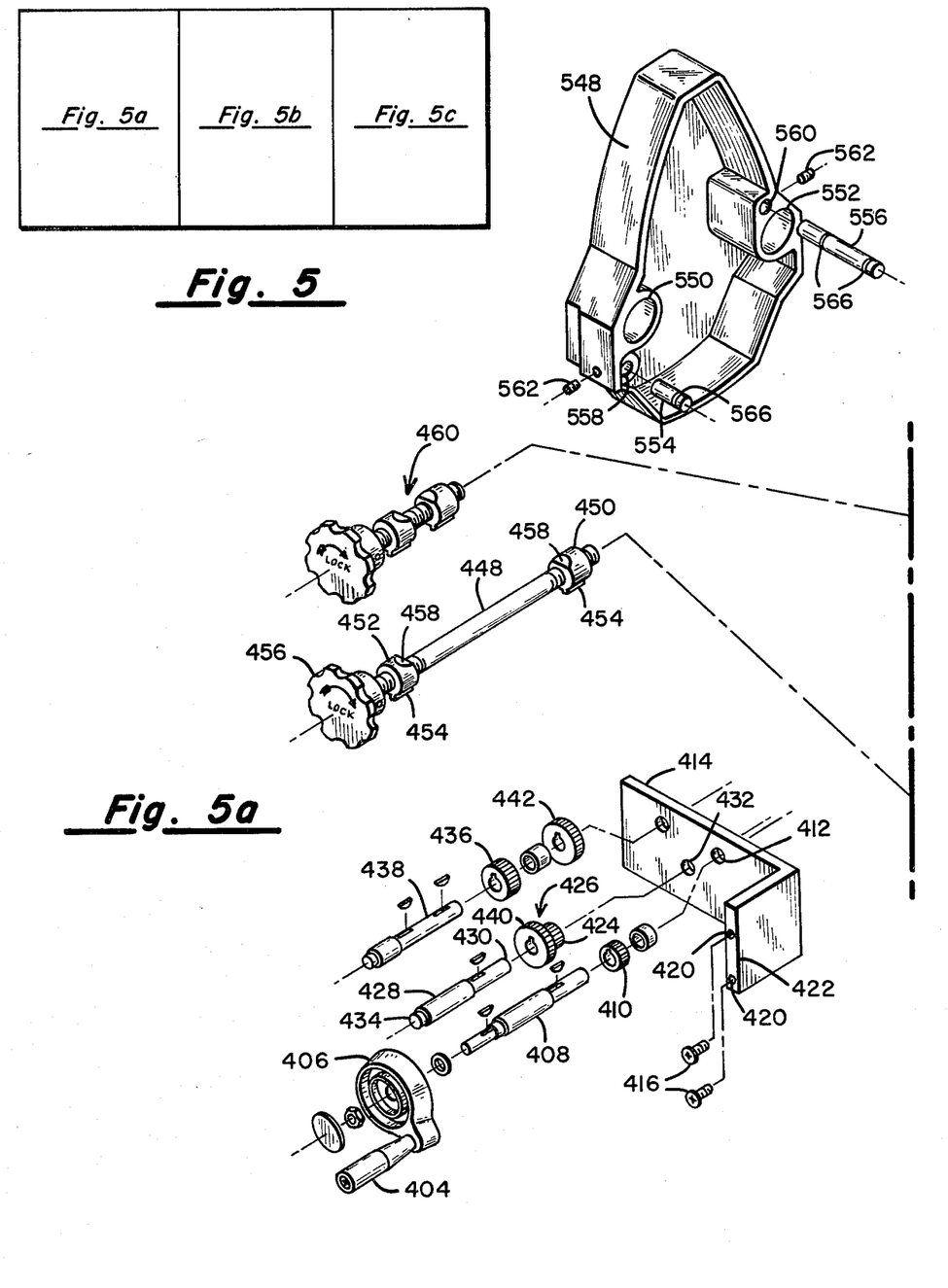
FIGS. 5a through 5c, when arranged as shown in FIG. 5, depict by means of an exploded view the constructional features of the power head portion of the multi-purpose tool.
Figure 5B:
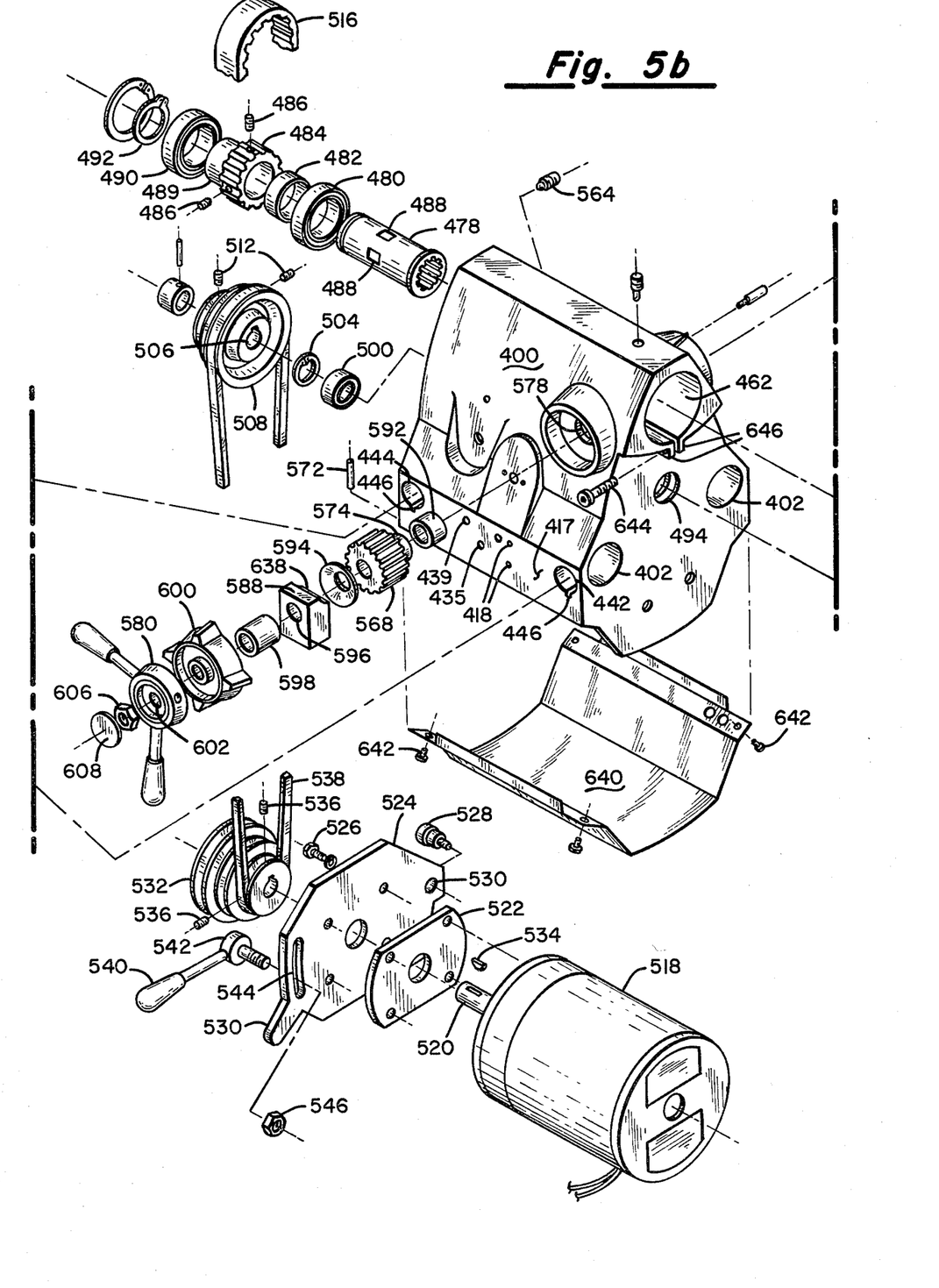

Contained within the power head is a variable speed direct current motor whose speed of rotation is governed by a rheostat 64. The shaft of the motor is coupled through a suitable pulley and belt drive to a driven shaft which is gear coupled to an arbor 66 (FIG. 2) extending outward from the righthand edge of the power head 60 when viewed in FIG. 1. By employing multistep pulleys on both the motor shaft and the associated driven shaft and through the use of the motor speed control rheostat 64, it is possible to achieve relatively continuous output shaft speeds ranging from less than 10 to approximately 7200 RPM. In changing the position of the drive belt with respect to the steps on the pulleys in question, the belt cover portion 68 of the power head 60 may be slid to the left and the locking knob 70 lifted upward to release the motor mounting plate so that it may be repositioned to provide any necessary slack in the belt so that repositioning of the belt on the step pulley can be easily accomplished. The motor mounting plate, itself, has an extension finger 72 extending outward from the cover 68 to assist in this manipulation. The exact details of how this is done will become more clear as the description progresses, especially when the structure of FIG. 5b is set forth.

As a safety feature, a key operated electrical switch 74 is provided so that the drive motor may not be energized unless the operator inserts a key into the lock and rotates it to close the switch, allowing energization of the drive motor.

Also mounted on the ways 46 and 48 is a carriage assembly indicated generally by numeral 76. The assembly includes a carriage base 78 and a carriage table 80 mounted on the upper surface thereof (FIG. 1). The tble 80 is provided with a plurality of parallel T-grooves to facilitate the locking of one or more accessories to the surface thereof. Disposed with the carriage base is a variable speed gear motor (not shown) which is arranged to drive a gear which is meshing with the rack gear 52 on the way 46. The knob 82 is coupled to a rheostat which is preferably calibrated in terms of inches per second of carriage travel with respect to the ways on which it rides. A further electrical control is provided by a three position electrical switch 84 which, when in its center position, interrupts the power to the carriage motor and, when in its left or right position, causes the motor to rotate in a direction tending to move the carriage to the left or right, respectively.

Figures 4, 4A:
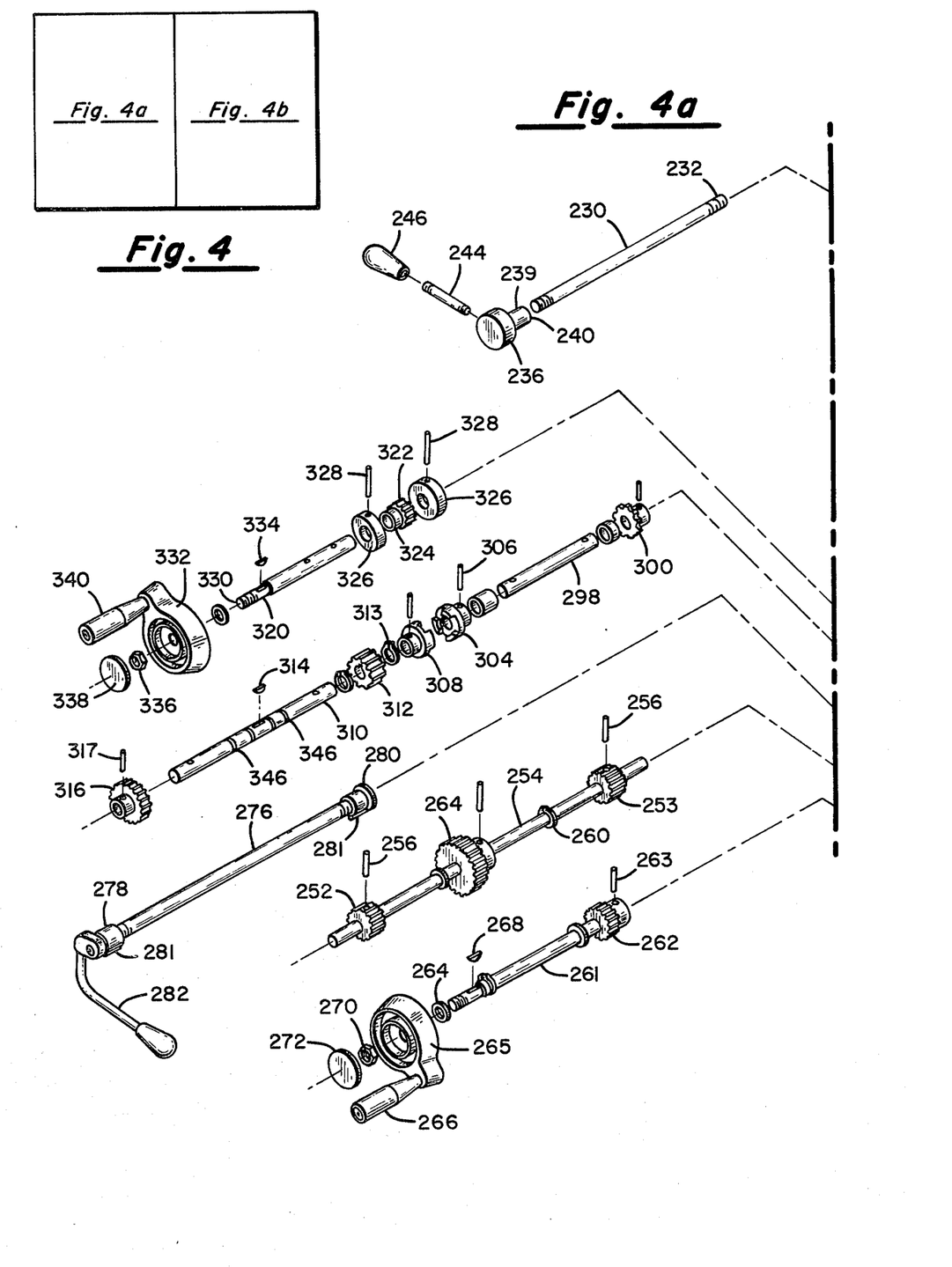
FIGS. 4a and 4b, when arranged as shown in FIG. 4, depicts by means of an exploded view the constructional features of the power carriage assembly.

In addition to the gear motor drive for the carriage assembly 78–80, there is also included a manual crank 86 which includes a coupler 304–308 in FIG. 4a such that the knob 86 may selectively be made to engage or be disengaged from the gear which is coupled with the rack 52 on the way 46. As such, the carriage may be moved to the left or right by rotating the crank 86 in an appropriate direction with the motor switch 84 in its off position.

The carriage base 78 has formed on either side thereof a bore which is adapted to receive table guide pins 88 and 90 which support a tilt table 92 by way of a trunion gauge member 94. The table guide pin 88 has formed on a side surface thereof a rack gear (not shown in FIG. 1) which is adapted to be engaged by a pinion (not shown) coupled to the shaft of a manually operable crank 96. Thus, by rotating the handle of the crank 96, the table can be raised or lowered relative to the arbor of the power head 60. As is illustrated in FIG. 1, a circle saw blade 98 is secured to the arbor and extends through a slot opening formed in the table 92. By raising and lowering the table with the crank 96, the depth-of-cut can be set to a desired value. Once the desired height has been reached, a table lock handle 100 may be operated to prevent the table from moving from its own weight. A similar lock crank assembly 102 is mounted on the carriage table 80 so that the entire carriage assembly may be locked relative to the ways 46 and 48.

As is illustrated in FIG. 2, the ways 46 and 48 may be repositioned in a generally vertical orientation with respect to the top surface 14 of the base 12. This is accomplished by lifting the spacer assembly 50 from the tailstand 22 and rotating the ways about the axis of the pivot member 44. Following repositioning, the assembly may be locked in the vertical position by rotating a locking screw member 104.

With the ways 46 and 48 in a vertical position, the multi-purpose tool may be made to function as a drill press as illustrated more particularly in FIG. 2. When in this configuration, the table 92 may be repositioned by its trunion 94 so that the top surface of the table 92 is generally perpendicular to the longitudinal axis of the ways. Being secured to the carriage assembly 76, the table may be raised or lowered by either operating the electrical switch 84 or by utilizing the hand crank adjustment 86. Attached to the end of the arbor 66 is conventional drill chuck 106 for receiving and holding a drill bit (not shown). The drill bit may be brought into proximity with the workpiece situated on the table 92 be either repositioning the carriage 76 or the power head 60 with respect to the ways 46 and 48. The drill bit may be made to engage the workpiece through operation of the hand feed control knobs 108 or 110 which, when turned in a clockwise direction (when viewed in FIG. 2) will cause the quill assembly 112 to descend outwardly from the bottom edge surface of the power head 60. Disposed upon the same shaft as the quill feed knob 110 is a quill feed lock ring 114 which the operator may tighten to hold the quill at a desired degree of extension from the power head. This feature is, of course, of value when the multi-purpose tool is being used as a stationary router or a high speed shaper. While blocked from view in FIG. 2, there is also mounted on the shaft supporting the quill feed knob 108 a knob which permits the operator to set the depth-of-feed for the quill, chuck and drill bit assembly. As was mentioned earlier, the view of FIG. 1 illustrates the multi-purpose tool when used as a table saw. In this configuration the saw blade 98 is secured to the arbor 66 and made to rotate therewith. When it is desired to convert the multi-purpose tool to a lathe, the extension table 58 is removed from the pivot block 44 and a tailstock such as 32 is substituted for the extension table. Also, the saw table assembly 92 is removed from the carriage base assembly 76 by lifting the pins 88 and 90 from the corresponding bores formed in the carriage base. Next, a suitable workpiece holding tool is inserted onto the arbor and the workpiece is suspended between the tailstock and the arbor drive workpiece holder. A suitable lathe tool rest may be mounted on the carriage base so as to extend toward the rotating workpiece. The operator may then utilize a hand-held chisel to make desired cuts on the revolving workpiece in the usual fashion of a lathe operation.

When operating as a disc sander, the operator will utilize the horizontal disposition of the tool and will mount a suitable metal disc on the arbor. The table 92 will be repositioned along the ways such that the edge thereof facing the end of the power head will be a predetermined distance from the sander disc. Hence, the workpiece to be operated upon may be held on the surface of the table and brought into engagement with the spinning sander disc.

In that there is a bore formed completely through the motor driven spindle of the power head, a draw rod 116 (FIG. 1) having a knurled gripping portion 118 at one end thereof and a threaded surface at its other end may be extended through the spindle so as to engage a threaded bore in a tapered collet-type tool supporting fixture. Hence, by turning the knurled portion of the draw rod, the tool holder placed on the end of the arbor 66 will be drawn snugly and with centering precision into the arbor.

Figure 3:
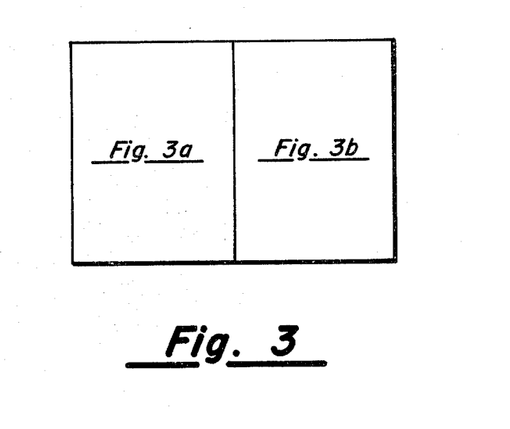
FIGS. 3a and 3b, when arranged as illustrated in FIG. 3, illustrate by means of an exploded view the support structure whereby the multi-purpose power tool can be utilized in either a horizontal or a vertical disposition.

Now that the overall configuration of the multi-purpose tool has been set forth in general, consideration will be given to various constructional details of the overall assembly and, in this regard, the exploded drawings when arranged as in FIGS. 3 through 5 will assist materially in understanding the detailed construction of the preferred embodiment.

Figure 3A:
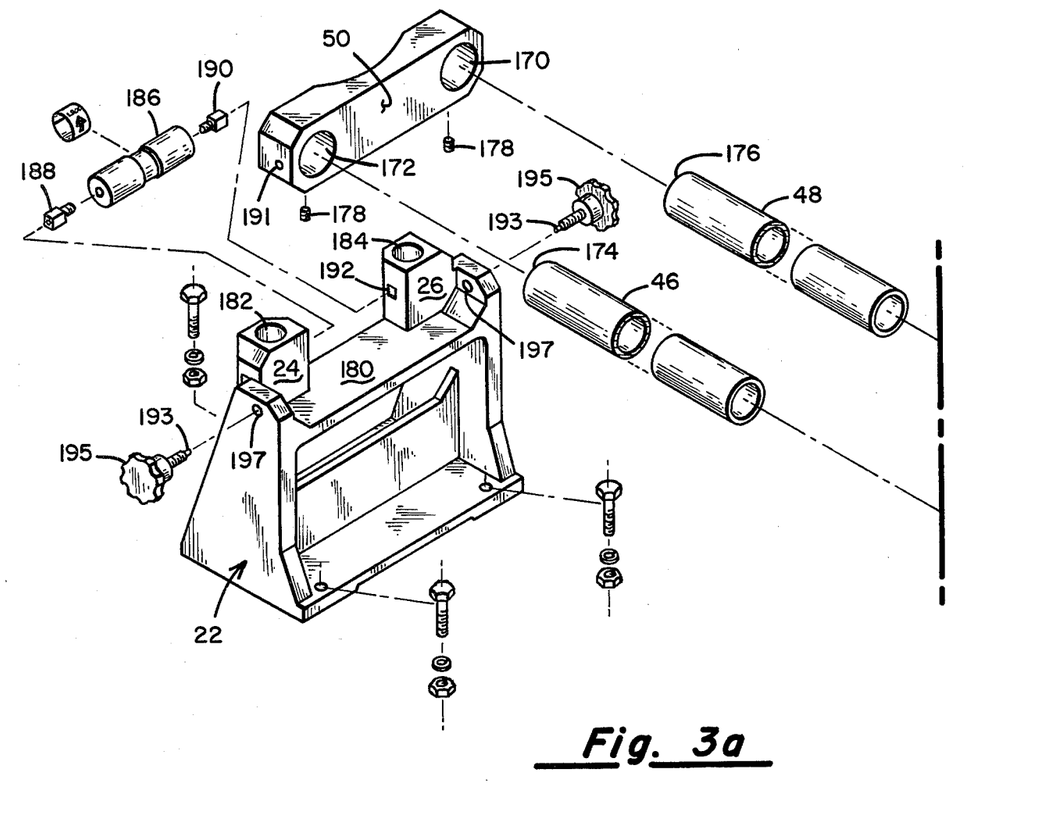
Figure 3B:
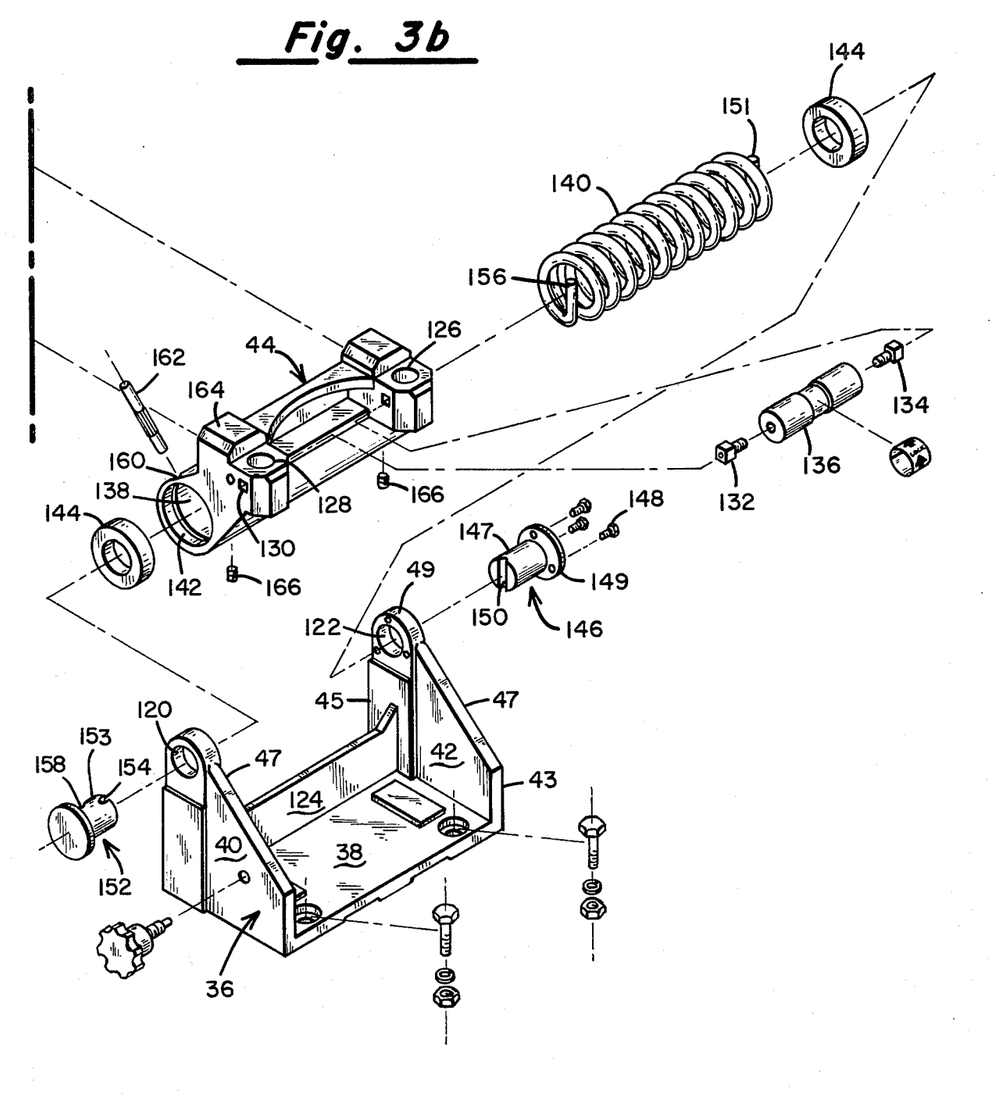

Referring then to FIGS. 3a and 3b, there is shown an exploded view illustrating the manner in which the tubular ways 46 and 48 are rotatably mounted with respect to the surface 14 of the work bench or stand 12. Specifically, there is provided a tail base member 36 in the form of a generally U-shaped bracket having a base portion 38 along with integrally formed, spaced-apart side walls 40 and 42 projecting perpendicularly and upwardly therefrom. The sides 40 and 42 have a front edge as at 43 of a lesser dimension than the rear edge 45 and, accordingly, they include a sloped upper edge (as at 47), the rear and upper edges being connected by a suitable radius curve as at 49. Formed in the curved portion of the side walls 40 and 42 are circular apertures 120 and 122. A reinforcing rib 124 extends perpendicularly from the base 38 and joins the side walls 40 and 42 as illustrated. The tail pivot block 44 is provided with first and second spaced apart bores 126 and 128 which, as indicated earlier, are arranged to receive the cylindrical pins of any desired accessory such as the extension table 58 or the tailstock 32 of FIG. 1. The tail pivot block 44 further includes rectangular apertures as at 130 which intersect with the bores 126 and 128. These rectangular apertures are arranged to receive the heads of first and second bolts 132 and 134 whose threaded portions extend into the ends of a locking cylinder 136. The surface of the cylinder is preferably knurled to facilitate gripping. It can be seen, then, when the knurled cylinder is rotated, the bolts 132 and 134 will be extended or retracted depending upon the direction of rotation of the handle. As such, this arrangement can be used to lock whatever accessory may be mounted within the bores 126 and 128.

The tail pivot block 44 further includes a third bore 138 which extends generally transverse to the axes of the bores 126 and 128. The diameter of the bore 138 is such that a coiled torsion spring 140 may be inserted therein. Each end of the bore 138 is provided with a counter bore 142 of a slightly larger diameter than the bore 138 so as to receive a sleeve spacer 144. The tail pivot block 44 with its internal torsion spring and sleeve spacers may then be disposed between the side walls 40 and 42 of the tall base member 36 with the counter bores 142 in general axial alignment with the apertures 120 and 122 of the tail base 38. A pivot hub 146 having a cylindrical stem portion 147 and an end flange 149 formed thereon is adapted to be affixed to the right side wall 42 with the cylindrical stem portion extending through the aperture 122 and into the tail pivot block 44, it being held in place by a plurality of bolts as at 148. The end of the cylindrical stem portion is recessed as at 150 so as to fit around the straight end stem 151 of the torsion spring 140 and to hold that end of the spring against rotation. In a somewhat similar fashion, a pivot hub 152 is arranged to have its cylindrical portion 153 pass through the aperture 120 of the left side wall 40 of the tail base 36, through the sleeve spacer 144 and into the bore 138 formed in the tail pivot block 44. Again, the end portion of the pivot hub 152 is provided with a semicircular recess 154 designed to grip the straight end portion 156 of the torsion spring 140. Extending radially through the shank 153 of the pivot hub 152 is a bore 158 which, when aligned with a corresponding bore 160 formed in the tail pivot block, permits a locking pin or dowel 162 to be inserted to thereby hold the pivot hub 152 in a fixed relationship with respect to the pivot block.

The pivot block 44 includes on its rear face 164 further spaced apart cylindrical bores (not shown) of a diameter sufficient to receive the outside diameter of the tubular ways 46 and 48. As such, these tubular ways are maintained in a spaced apart relationship. The pivot block 44 is positively held on the ends of the tubular ways by means of set screws 166.

The tubular ways 46 and 48 are maintained in a parallel relationship by way of the tube spacer member 50 which includes bores 170 and 172 which are on the same center spacing as the bores on the rear face 164 of the tail pivot block 44. Again, the diameter of the bores 170 and 172 are such that the ends 174 and 176 of the tubular ways 46 and 48 may be received therein. Set screws 178 hold the tube spacer 168 in place on the ends of the ways.

As was mentioned above, there is also attached at the righthand end edge of the bench surface 14 a support stand 22 having affixed thereto or formed thereon support studs 24 and 26. These studs are positioned upon a shelf-like surface 180 in a spaced apart relationship and includes bores 182 and 184 for receiving the cylindrical pins on a removable accessory such as the tailstock 32 in FIG. 1. To lock this assembly in place, there is provided a knurled cylindrical handle 186 having threaded apertures in opposed ends thereof for receiving square headed bolts 188 and 190. The heads of these bolts enter into rectangular apertures as at 192 formed in the side walls of the support studs 24 and 26 and extending normal to the axis of the bores 182 and 184. Hence, by turning the handle 186, the bolts 188 and 190 can be made to move against or away from the accessory support pins inserted into the bores 182 and 184.

As can best be seen in FIG. 1, when the ways are resting in their horizontal orientation with respect to the upper surface of the bench 12, the tube spacer 50 rests upon the shelf member 180 of the support stand 22. The spacer 50 is dimpled on each end surface as at 191 so as to receive the ends 193 of locking knob assemblies 195 which pass through internally threaded bores 197 formed in the support stand 22. By this means, the pivotable ways are held fixed in a horizontal position until released and manually repositioned.

Having explained the general configuration of the multi-purpose power tool support structures, consideration will now be given to the details of the movable carriage assembly which is fitted on the tubular ways and used to transport a workpiece or a workpiece holding table with a high degree of precision. For purposes of simplification, those parts and mechanisms not associated with the carriage assembly have been eliminated from the view comprised of FIGS. 4a and 4b. However, those skilled in the art will readily perceive from the overall drawings of FIGS. 1 and 2 the positional relationship of the remaining mechanisms with respect to the elongated tubular ways 46 and 48.

Figure 4B:
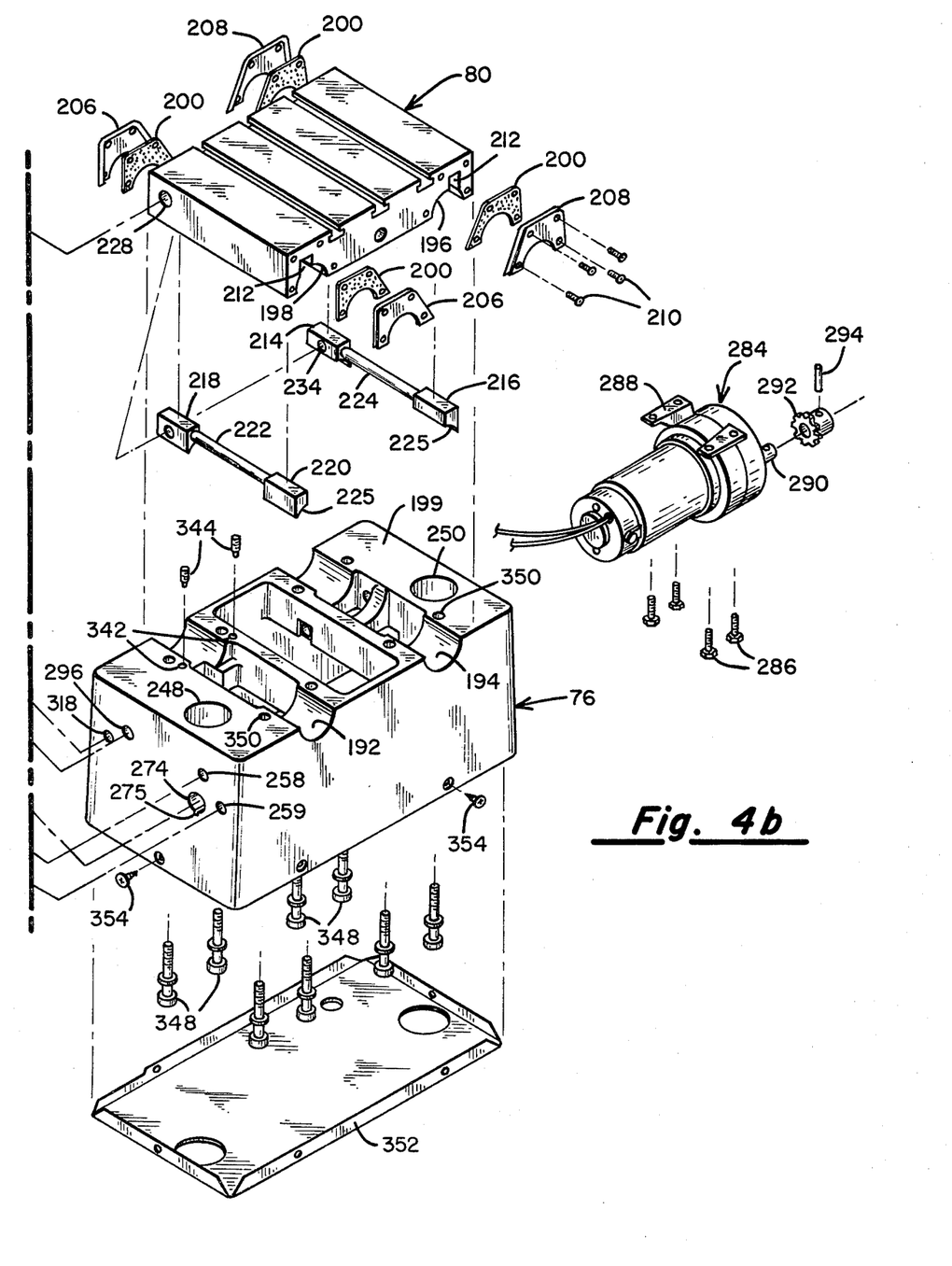

The carriage assembly includes a cast metal base 76 which is machined to appropriate tolerances. Formed in the upper surface 199 of the base 76 are semicircular grooves 192 and 194 of a diameter sufficient to receive the outside diameter of the ways 46 and 48, respectively, with a predetermined tolerance therebetween. The carriage table 80 which is adapted to be bolted to the top surface of the carriage base casting 76 also includes semicircular grooves as at 196 and 198 such that when the carriage table 80 is bolted in place on the upper surface of the carriage base 76, the ways 46 and 48 will be sandwiched therebetween. To provide proper lubrication of the ways as the carriage is made to traverse same during operation, a plurality of felt inserts, as at 200, are provided. These felt pads are impregnated with a suitable lubricant and are held in place in recesses provided in end plates 206 and 208 and which are bolted to the side edge walls of the carriage table by screws 210. When so held, the pads rub upon the ways as the carriage is moved therealong to keep them coated with a thin layer of lubricant.

With continued reference to the details of the carriage table 80, it can further be seen that projecting upwardly from the semicircular grooves 196 and 198 are rectangular recesses as at 212 which are adapted to receive the corresponding rectangular portions of a gib lock assembly. The gib-lock assembly includes the gib elements 214–220 along with the gib rods 222 and 224 on which they are mounted. The gib elements 216–220 comprise generally rectangular blocks having a circular profile as at 225 cut in the bottom portion of each. The radius of curvature of these portions corresponds to the general radius of the ways 46 and 48.

This gib assembly is fitted into the rectangular recesses 212 so that the circular profile portions of each gib element is positioned with respect to the corresponding surface of its associated tubular way. The table 80 is then provided with a transversely extending bore 228 into which may be fitted a gib locking shaft 230 which is threaded as at 232 so as to engage the internal threads 234 on the gib element 214. Attached to the other end of the gib locking shaft 230 is a stub 236 having an internally threaded shaft 239 of a diameter sufficient to fit within the bore 238 while defining a shoulder 240 for abutting the gib element 218. A short rod 244 is adapted to be threadedly attached to the stub 236 and has a suitable decorative knob 246 is threaded to the opposite end of this rod 244 thereby forming a crank arm. When the crank arm is rotated in a clockwise direction when viewed as in FIG. 4, the gibs 214 and 216 on rod 224 will be drawn towards the gibs 218 and 220 on rod 222 and, in doing so, will grip the tubular ways with which they are arranged to cooperate, thereby locking the table assembly in place against longitudinal displacement.

In addition to the semicircular grooves 192 and 194, the carriage base 76 includes transversely extending vertical bores 248 and 250 which are arranged to receive cylindrical pins associated with a workpiece holding device of some type. As was illustrated in the view of FIG. 1, the accessory device may comprise a saw table 92 having support pins 88 and 90 depending therefrom. It is these support pins 88 and 90 which are adapted to fit within the bores 248 and 250. In practice, a surface of the table support pins 88 and 90 are provided with a gear rack (not shown) which is arranged to cooperate with a pinion gears 252 and 253 which are locked against rotation on a idler shaft 254 by means of roll pins 256. The idler shaft 254 is arranged to have its ends fit within a horizontal transversely extending bore 258 formed in the carriage base casting 76 and the shaft is held in place by a snap ring as at 260. The idler shaft 254 is arranged to be driven by a drive shaft 261 having a gear 262 secured thereto by a roll pin 263. The drive shaft 261 is mounted within a bore 259 which runs parallel to the bore 258. Gear 262 is arranged to mesh with a gear 264 on the idler shaft and one end of the shaft 261 extends outwardly from the base casting by a predetermined distance so as to receive a crank assembly including a thrust washer 264, a decorative molded or cast knob 265 and a crank handle 266. The knob is held in place on the shaft by a woodruff key 268 and a nut 270. A decorative cap 272 may snap into a recess formed in the knob 265 so as to hide the nut 270 from view. It can be seen, then, when the crank handle 266 is rotated the shaft 261 will also be rotated, as will the idler shaft 254. The gears 252 and 253 252 being in engagement with the rack on the accessory table or the like will cause the height of the table to be adjusted. The gear ratio employed between the drive shaft 261 and the idler shaft 254 provides a desired degree of control over the movement of the accessory device whose legs are inserted into the bores 248 and 250.

Once the accessory table is at a desired elevation it is arranged to be locked in place by a table locking assembly which will now be described. Specifically, there is located in proximity to the vertical bores 248 and 250 a horizontal and transversely extending bore 274 having a keyway 275 which is arranged to receive a gib locking shaft 276 having gib elements 278 and 280 threadedly secured thereon. The thread direction of the gib 278 is opposite from that of 280, one being a righthanded thread and the other being a lefthanded thread. The gib members also have a narrow rib as at 281 formed on the periphery for slidingly fitting within the keyway 275. These gib members cooperate with the table support pins 88 and 90 when present in the bores 248 and 250. When shaft 276 is rotated by means of the crank assembly 282, it causes the gibs to be translated and thereby drawn firmly against the sides of the pins preventing vertical movement thereof from the position established by the operator's manipulation of the crank 266 as previously described.

As was indicated earlier, translation of the carriage assembly back and forth along the tubular ways may be either accomplished manually or automatically by way of an electric motor. The structure for achieving this result is also set out in the exploded view of FIG. 4. Specifically, the DC electric motor and associated gear train is indicated generally by numeral 284 and this motor is adapted to be mounted in a suitable recess (not shown) formed on the underside of the carriage base 76 by means of bolts 286 which pass through the mounting flanges 288 of the motor assembly. Secured to the shaft 290 of the gear motor 284 is a sprocket wheel 292. A roll pin 294 has proven to be a convenient means for securing the sprocket wheel 292 on the shaft 290 so that they rotate in unison. A transversely extending bore 296 is formed in the casting 76 so as to receive a rear coupler shaft 298 on which is attached a second sprocket wheel 300. An endless chain (not shown) is coupled between the sprocket 292 on the motor and sprocket 300 on the shaft 298.

Attached to the opposite end of the rear coupler shaft 298 is a coupler member 304. The coupler is secured to the shaft 298 and rotates therewith by virtue of a roll pin 306. The coupler 304, itself, comprises a generally cylindrical tubular segment having a plurality of spaced apart notches formed in the exterior end edge thereof. A mating coupler member 308 has corresponding notches so that the teeth of one fit within the notches of the other. Coupler element 308 is locked onto a front coupler shaft 310 which has a pinion gear 312 positioned thereon and held in place by snap rings 313 and against rotation by a woodruff key 314. A further pinion gear 316 is secured to the front coupler shaft 310 by a roll pin 317. The front coupler shaft 310 is journaled for rotation within the bore 296 formed in the carriage base casting 76 in axial alignment with the rear coupler shaft 298.

Disposed in close proximity to the transversely extending bore 296 is a further shaft receiving bore 318 for receiving a drive shaft 320 on which is mounted a gear element 322 having a cylindrical shoulder 324 extending outwardly from a side edge thereof. This gear element is arranged to be sandwiched between two spacers 326 which are secured to the shaft by roll pins 328. The end 330 of the shaft 320 extends outwardly from the side edge of the casting 76 and is arranged to pass through an aperture formed in a decorative knob 332 which is secured to the shaft by means of a woodruff key 334 and a nut 336. Again, a decorative cap 338 may be snapped into a recess formed on the molded knob 332 to conceal the nut 336 from view. A crank handle 340 is attached to the knob to facilitate the rotation thereof.

It should be mentioned at this point that the knob 332 and the shaft 320 attached to it when mounted in the carriage base 76 can be translated inwardly and outwardly within predetermined distances established by the relative dimensions of the spacing maintained between the carriage base surfaces and the spacers 326. When the shaft 320 is in its outwardmost position with respect to the side surface of the carriage base 76, the gear 322 on the shaft 320 engages the gear 312 on the shaft 310 so that when the crank 340 is rotated, the pinion gear 316 will also be rotated. It is the pinion gear 316 which cooperates with the rack formed on the way 46 and, as such, the carriage base assembly is made to move along the ways in a direction determined by the direction of rotation of the crank 340. At this time, however, the coupler elements 304 and 308 are disengaged so that only manual manipulation of the crank and knob assembly 340–332 can be used to reposition the carriage base.

It is also possible to automatically move the carriage base by first applying power to the gear motor 284 and subsequently pushing the knob 332 toward the side surface of the carriage base 76. The energization of the gear motor causes the rear coupler shaft 298 to be driven via the sprocket and chain drive. When the knob assembly 332 is pushed inwardly towards the carriage base, the spacers 326 are made to abut the edge surfaces of the gear 312 and the inward force translates the front coupler shaft 310 in a direction such that the fingers on the coupler element 308 may engage the notches on the corresponding coupler element 304. Once joined, the shaft 310 is driven in unison with the motor drive rear coupler shaft 298. The pinion 316 being fastened to the front coupler shaft 310 is driven with it so as to cause a translation of the carriage base assembly along the ways 46 and 48. Of course, to disconnect the automatic drive, it is only necessary to again pull outwardly on the knob 332 which causes a corresponding movement of the shaft 310 so that the coupler elements 304 and 308 become disengaged.

Formed in the top surface 199 of the carriage base casting are threaded apertures 342 which are adapted to receive a ball plunger as at 344. The ball plungers each comprise an externally threaded cylindrical tube containing a spring which normally urges a spherical ball member outwardly therefrom. When threaded into the apertures 342, the balls cooperate with notches 346 formed on the front coupler shaft 310 so as to act as a detent, thereby preventing unintended engagement of the coupler elements which might result from vibration or the like if this detent arrangement were not involved.

The carriage table 80 is adapted to be bolted to the carriage base 76 by a plurality of socket head cap screws as at 348 which are inserted from the underside of the carriage base casting 76 and pass through corresponding apertures 350 in the top surface 99 of that carriage base so as to enter threaded holes (not shown) formed on the underside of the carriage table 80. A bottom shield 352 may then be fastened to the underside of the carriage base 76 by screws as at 354.

Having completed the description of the carriage assembly, consideration will next be given to the details of the power head assembly. In this regard, reference is made to the drawings of FIGS. 5a through 5c.

Figure 5C:
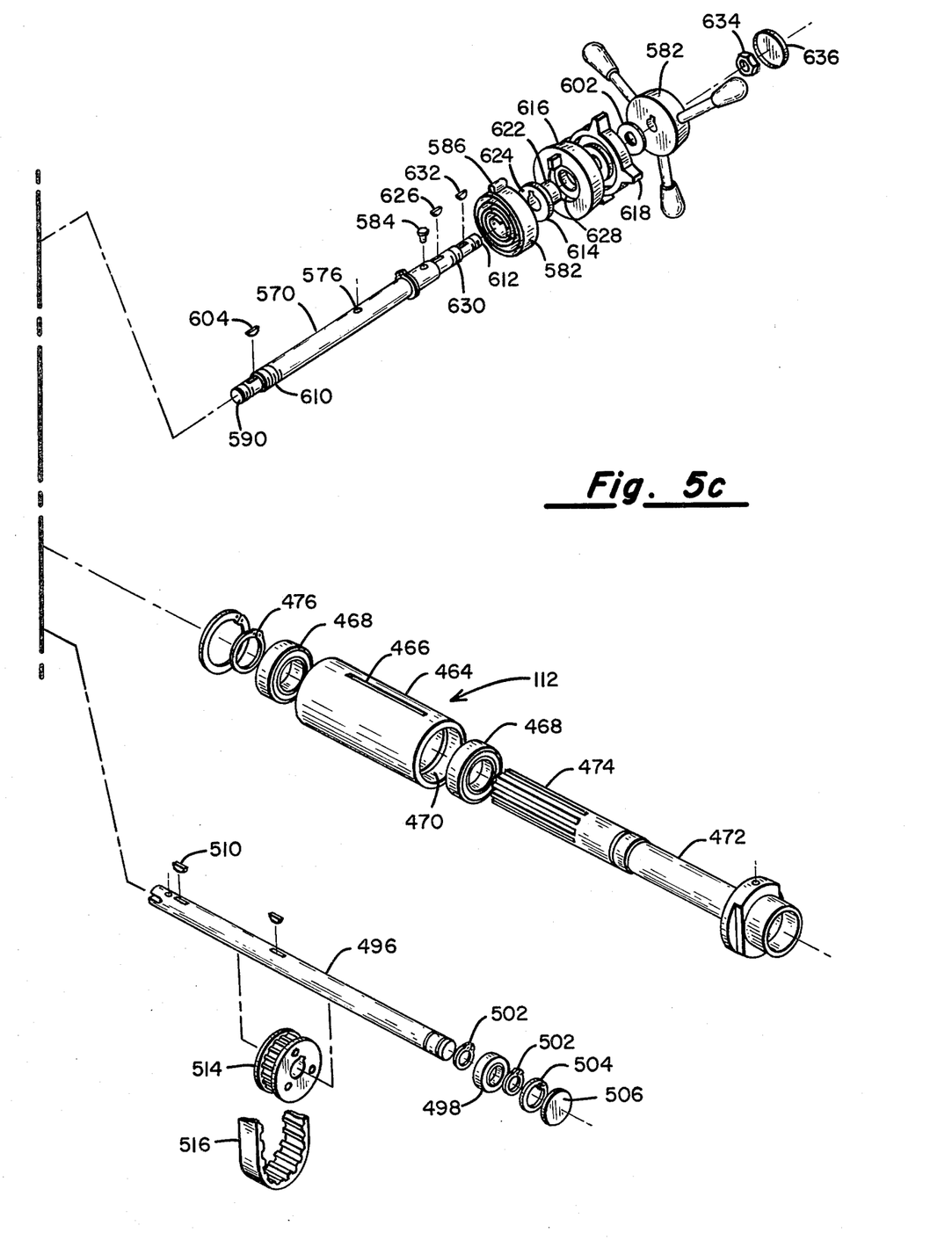

Referring, then, to these Figures, identified by numeral 400 is the power head casting which may be formed from steel, aluminum or a suitable alloy. Formed lengthwise through the casting 400 are spaced-apart cylindrical bores 402 through which the tubular ways 46 and 48 are arranged to pass. Like the carriage assembly previously described, means are provided for translating the power head 400 back and forth along the tubular ways. Specifically, a manually operable crank assembly is coupled through a reduction gear train to the pinion gear which is designed to mate with the rack gear surface on the tubular way 46. More specifically, a crank comprising the handle 404, the knob 406 and a drive shaft 408 has a gear element 410 fastened to it and the otherwise free end of the shaft 408 is journaled for rotation in an aperture 412 formed in an L-shaped bracket comprising the gear plate 414. The rear gear plate 414 is mounted internal to the power head casting 400 and is secured thereto by the screws 416 which are arranged to pass through the apertures 418 on the side surface of the power head 400 and into threaded apertures 420 provied on the edge 422 of the shorter leg of the L-shaped gear plate 414.

The gear 410 is adapted to mate with the portion 424 of a step gear indicated generally by numeral 426. This gear is, in turn, mounted on an idler shaft 428 whose end 430 is journaled for rotation in the aperture 432 formed in the rear gear plate 414. The other end of the shaft 428, i.e., end 434, is, in turn, journaled for rotation in an aperture 435 formed in the vertical side wall 417 of the power head casting 400.

In a similar fashion, a gear 436 is secured to a driven shaft 438 which shaft is journaled for rotation in the gear plate 414 and the aperture 439 in the surface 417 of the power head casting 400 so that the gear 436 meshes with the portion 440 of the step gear 426. The pinion gear 442 is also fastened onto the driven shaft 438 and is arranged to cooperate with the rack formed on the surface of the tubular way 46. Thus, by rotating the crank 404 and its associated knob 406, it is possible to translate the power head assembly back and forth along the tubular ways. By proper consideration of the gear ratios involved, accurate control may be made over this positioning as well as the rate of advance.

As was the case with the carriage assembly, means are provided for positively locking the power head 400 at a desired position along the tubular ways. Specifically, first and second bores 442 and 444 are formed transversely through the width dimension of the power head casting 400 as illustrated, and each such bore is provided with a generally rectangular notch or keyway 446 running the length thereof. The bore 442 is adapted to receive a locking assembly including a rod 448 which is threaded at each end so as to receive internally threaded locking elements 450 and 452. The direction of the threads on the shaft 448 are opposite one another and each of the locking elements is provided with a generally rectangular projection 454 which is dimensioned so as to slidingly engage the keyways 446 formed in the bores 442 and 444. A suitable knob or handle 456 is connected to the end portion of the shaft 448 extending outwardly from the side surface 417 of the casing. By rotating this knob, then, the locking elements 450 and 452 can be made to move toward one another and in doing so, shaped portions thereof 458 come into abutment with the tubular ways, applying a squeezing force to them and locking the power head in place. By rotating the knob 456 in the counterclockwise direction, the locking elements 452 and 450 move in the opposite direction, i.e., away from one another, such that the grip on the tubular ways is released. The locking assembly associated with the bore 444 is indicated generally by numeral 460 and is identical in all respects to the lock assembly previously described except that it is arranged to cooperate with only one of the tubular ways, i.e., way 46, which passes through the bore 402 of the power head 400. As such, the length dimension of the shaft of the locking assembly 460 is substantially shorter than the shaft 448 which is designed to span both tubular ways. By providing both front and rear positioned locks, any tendency for the power head to be cocked into disalignment along the ways is avoided.

Thus it has been shown how the power head may be moved back and forth relative to the tubular ways and how that head may be locked at any desired position along the length of the ways. Next to be considered will be the quill shaft assembly which is used to extend and retract the quill 112 with respect to the longitudinally extending bore 462 which is formed through the power head casting 400.

The quill itself comprises a tubular member 464 having a rack gear (not shown) formed on the undersurface thereof which is not exposed to view in the drawing of FIG. 5c. The cylinder 464 is also provided with a longitudinally extending slot 466 formed in the peripheral surface thereof. The cylinder is also adapted to receive suitably dimensioned bearing elements 468 in counterbores 470 formed in opposed ends thereof. A spindle shaft 472 passes through the central opening of the bearings and, accordingly, is free to rotate therein. A tool holding chuck is adapted to be removably attached to the end of the spindle shaft 472. The spindle shaft is splined as at 474 and this splined portion extends outwardly from the quill cylinder 464. The complete assembly is held together by a snap ring 476. Once the quill assembly 112 is fitted within the bore 462 of the power head 400, a broached sleeve member 478 is fitted over the splined portion 474 of the spindle and a front bearing 480 is slid onto the sleeve so as to abut a front shoulder thereof. Next, a spacer member 482 is positioned onto the sleeve 478 as is a timing pulley 484. The timing pulley 484 is secured to the sleeve 478 by means of set screws 486 which pass through the surface thereof and abut the flats 488 formed on the peripheral surface of the sleeve 478. Completing the assembly is a further spacer 489 and a rear bearing 490. Again, a suitable snap ring 492 may be employed to secure the several parts in position on the sleeve 478.

When assembled in the fashion indicated, then, the broached sleeve 478 is adapted to be driven when the timing pulley 484 is driven. Because of the splined coupling, the spindle 472 will also be rotated.

The mechanism for driving the spindle will next be explained. As is shown, a further longitudinal bore 494 is formed in the casting 400 immediately below the quill bore 462 and passes completely through the power head casting. This bore is arranged to receive an idler shaft 496 which extends substantially the full length of the power head and exits from the rear face thereof by a predetermined distance. The shaft 496 is journaled for rotation in the bore 494 by means of a front bearing 498 and a rear bearing 500, which bearings are held in position on the shaft 496 by means of snap rings 502. The shaft assembly itself is held in the casting 400 by further snap rings 504. A decorative plug 506 is arranged to be inserted into the entrance of the bore 494 to conceal the bearing, etc., and the portion of the shaft 496 exiting from the rear face of the power head 400 fits into a bore 506 of a stepped pulley or idler sheave 508. The woodruff key 510 prevents rotation of the pulley 506 on the shaft 496 and set screws 512 may conveniently be used to hold the pulley secure in position on the shaft 496. There is also mounted on the shaft 496 a socalled timing pulley 514. A flexible endless timing belt 516 passes around the timing pulley 514 and around the pulley 484 mounted on the broached sleeve 478. Hence, when the idler shaft 496 is driven, the broached sleeve 478 and its mating spindle 472 will also be driven.

The drive for the idler shaft comes from a suitable variable speed motor which may, for example, be a 1½ HP variable speed DC motor as at 518. The shaft 520 of this motor is arranged to pass through a hole formed in a spacer or shim plate 522 and through a hole in a motor mounting plate 524. The motor itself is adapted to be bolted to the motor mounting plate 524 by suitable fasteners such as bolts 526 which pass through holes formed through the motor mounting plate 524, the shim plate 522 and into threaded holes formed on the front face (not shown) of the motor 518.

The motor mounting plate 524 is, itself, pivotally attached to the rear face of the power head casting 400 by means of a shoulder screw 528 which passes through the aperture 530 in the motor mounting plate 524 and into a threaded hole (not shown) formed in the power head casting. The motor mounting plate 524 has a gripping handle or lever integrally formed therewith as at 530 and when the motor and motor mounting plate assembly are bolted in position on the power head casting, the lever 530 projects outwardly from the side surface thereof so as to be available for grasping by the user. (See lever 72 in FIG. 1.)

Secured to the end of the motor shaft 520 is a stepped pulley or sheave 532 and this is held in place by means of a woodruff key 534 and set screws 536. It is to be noted that the orientation of the pulley 532 on the shaft 520 is reversed from the orientation of the stepped pulley or sheave 508 on the idler shaft 496. A V-belt 538 is arranged to couple the motor pulley 532 to the idler shaft pulley 508 and because of the fact that the motor mounting assembly can be rotated about the shoulder screw 528, it is possible to adjust the tensioning of the belt 538. A motor mounting plate lock assembly is also provided and includes a handle member 540 which passes into a threaded lock stud 542 which is arranged to pass through a slotted aperture 544 formed in the motor mounting plate 524 and through a mating aperture (not shown) formed on the rear face of the power head casting 400. A nut 546 is mounted on the inside of the casting such that when the handle 540 is rotated, the pressure applied to the motor mounting plate can be either increased or relieved. Thus, once the proper tension is established on the belt, the tension can be maintained by securing the lock.

To prevent accidental injury, a belt cover assembly indicated generally by numeral 548 is provided. It is provided with cylindrical bores 550 and 552 which pass through the thickness dimension thereof so that it may be slipped over the tubular ways 46 and 48. Its shape corresponds to the shape of the power head casting 400 so that an attractive profile is maintained when the belt guard is in place.

Pins or rods 554 and 556 are arranged to be fitted into bores 558 and 560 which extend parallel to the bores 550 and 552. These guide pins are held in place by set screws 562 and fit within mating bores (not shown) formed in the rear surface of the casting 400. A ball-type detent, as at 564, is arranged to cooperate with notches 566 formed on the guide pins so that the belt cover 548 will be positively held in place either in abutment to the rear surface of the casting 400 or displaced therefrom by a predetermined distance for facilitating speed change by manipulation of the positioning of the V-belt 538 with respect to the step pulleys 532 and 508.

Means are also provided for extending and retracting the quill assembly 112 from the aperture 462 formed in the power head casting 400. As was already mentioned, the quill cylinder 464 has a rack-type gear formed on the undersurface thereof but this rack gear is hidden from view in the drawing of FIG. 5c. This rack is arranged to mate with a corresponding pinion gear 568 which, in turn, is fastened to a quill shaft 570 by a roll pin 572 which is arranged to pass through an aperture formed on the shoulder 574 of the pinion 568 and through a corresponding aperture 576 formed through the quill shaft 570. The quill shaft 570 is journaled for rotation within a transversely extending bore 578 formed through the power head casting 400. The dimensioning is such that when so journaled, the pinion 568 freely engages the rack (not shown) formed on the quill cylinder 464. Thus, when the shaft is rotated, the quill assembly 112 will be moved inwardly and outwardly with respect to the opening in the front surface of the power head casting 400.

The shaft is arranged to be rotated by either a left or a right quill knob identified by numerals 580 and 582 respectively. Means are also provided for locking the quill at a desired degree of extension. Specifically, a coil-type quill spring 582 is positioned over the shaft 570 and the inner end thereof is fastened to the shaft 570 by means of a screw 584. The outer free end of the coil spring 582 couples to the inside of the power head casting 400 by having the integrally formed cylindrical projection 586 slidingly fit within a corresponding mating aperture (not shown) formed in the interior of the casting. The spring is wound so that it normally biases the shaft 570 such that the quill cylinder 464 is fully retracted within the power head. Thus, a positive force must be applied in the appropriate direction to the quill knobs 580 and 582 in order to overcome this spring force. When the quill knobs are released, the spring will again cause retraction of the quill into the bore 462 of the power head casting 400.

The locking feature is accomplished by the quill break block 588 which is arranged to cooperate with the side surface of the quill cylinder 464. Specifically, the left end 590 of the quill shaft 570 is made to pass through a spacer 592, through a bore formed in the pinion gear 568, through a Bellville washer 594, through the aperture 596 of the quill break block 588, through a spacer 598, through the threaded aperture of a lock knob 600 and into the central bore 602 of the quill knob 580. The woodruff key 604 and a nut 606 secures the quill knob 580 to the end 590 of the quill shaft 570. A decorative plug 608 may be used to hide the nut and woodruff key assembly from view.

Formed inwardly from the end 590 on the shaft 570 is a threaded segment 610. This segment cooperates with the internal threads formed on the lock knob 600. In a similar fashion, the rightmost end 612 of the quill shaft 570 passes through an inner break member 614, a depth stop member 616, a lock knob 618 and a thrust washer 620 and into the central aperture of the quill knob 582. The inner break member 614 comprises a cylindrical stem portion 622 having a disc-like portion 624 integrally formed on one end edge thereof. This member is secured to the shaft 570 by way of a woodruff key 626. A lug 625 extends outwardly from the side surface of the depth stop member 616. Thus, depending upon the angular positioning of the lug on the depth stop member 616, the shaft 570 is only free to rotate a predetermined number of degrees or revolutions. The lock knob 618 can be made to frictionally engage the mating surface of the depth stop member 616 because it has an internally threaded central bore designed to coact with the externally threaded portion 630 of the shaft 570. This inhibits unintended change in the depth stop setting. The woodruff key 632 is arranged to prevent relative rotation of the quill knob 582 with respect to the quill shaft 570 and a nut 634 when threaded onto the end portion of the shaft 570 holds the quill knob 582 in place. Again, a decorative cover plug 636 completes this portion of the assembly.

It can be seen that when the quill lock knob 600 is rotated in a clockwise direction on the threaded portion 610 of the quill shaft 570, it will apply a force through the tubular spacer 598 to the break block 588 causing it to move into abutment with the side surface of the quill cylinder 464. The quill break block 588 is suitably contoured as at 638 so as to conform to the cylindrical surface at the point of engagement.

A bottom shield member 640 is arranged to be bolted to the bottom of the power head casting 400 by bolts 642. It should also be mentioned that a socket head cap screw 644 is arranged to pass through the flanges 646 formed exterior to the slotted quill bore 462. This screw provides a convenient means for maintaining a proper clearance between the quill cylinder 464 and the inner walls of the bore 462 over years of prolonged usage.

Thus there has been described in detail the preferred embodiment of the present invention and the best mode contemplated by the inventor for implementing same. Those skilled in the art, however, will recognize from a reading of the specification and an examination of the drawings that various changes and modifications may be made to the structural features set forth herein and, accordingly, the subject matter described is to be considered as illustrative of the invention only. The scope of the invention is to be determined by the accompanying claims.

What is claimed is:

1. In a multi-purpose power tool of the type having a power head member with a motor driven tool supporting arbor extending from one edge thereof, said power head member being slidably mounted on tubular ways, a workpiece supporting carriage member slidably mounted on said tubular ways and movable therealong toward and away from said one edge of said power head member, the improvement comprising:
  (a) a stand member having a horizontal surface;
  (b) pivot means attached to said stand member and secured to one end of said tubular ways to maintain said ways in a parallel and spaced apart relationship to one another and allowing said tubular ways to be rotated between a horizontal and a vertical disposition with respect to said horizontal surface;
  (c) a torsion spring member operatively coupled to said pivot means and to said stand member for facilitating the movement of said tubular ways between said horizontal and vertical dispositions;
  (d) a rack gear formed on at least one of said tubular ways;
  (e) a shaft journaled for rotation within said carriage member and having a pinion gear secured thereto and engagable with said rack gear;
  (f) an electric motor mounted within said carriage member in driving relationship with said shaft; and
  (g) manually operable crank means selectively engagable with said shaft for rotating said shaft independently of said motor and moving said carriage member along said ways.

2. Apparatus as in claim 1 wherein said pivot means comprises:
  (a) a bracket having a base portion affixed to said stand member and parallel and spaced apart sides integrally formed therewith and extending perpendicularly therefrom, each of said side members having an aperture therethrough;
  (b) a pivot block having first and second bores formed therein for receiving the ends of said ways and a third bore extending transversely to said first and second bores, said torsion spring being disposed in said third bore;
  (c) a first link pin having a cylindrical stud extending through said aperture on one of said sides and into said third bore to engage said torsion spring at one end thereof and a head portion on said link pin being non-rotatably attached to said one of said sides;
  (d) a second link pin having a cylindrical stud extending through said aperture in the other of said sides and into said third bore to engage said torsion spring at the other end thereof; and
  (e) means for non-rotatably securing said second link pin to said pivot block.

3. Apparatus as in claim 1 and further including:
  (a) first and second parallel and spaced apart bores extending through said power head member transverse to and adjacent said tubular ways;
  (b) a pair of gib members slidably secured in said first and second bores; and
  (c) means for selectively urging said pairs of gib members into locking engagement with said tubular ways.

4. Apparatus as in claim 1 wherein said carriage member comprises:
  (a) a box-like motor housing member having parallel side end walls, a generally open bottom and a top surface, said top surface having two parallel, generally semi-circular grooves adapted to partially surround said tubular ways;
  (b) a fixed work table member having two parallel generally semi-circular parallel grooves formed in an under surface thereof adapted to partially surround said tubular ways when said fixed work table member is attached to said top surface of said housing, said semi-circular parallel grooves in said fixed work table member each including a longitudinal slot extending outwardly from the concave surface thereof;
  (c) gib means disposed in said longitudinal slot; and
  (d) means for selectively urging said gib means in a locking disposition with respect to said tubular ways or locking said carriage member at desired locations along the length of said tubular ways.

5. Apparatus as in claim 4 wherein said box-like housing includes:
  (a) a cylindrical bore formed through said top surface and proximate each end wall thereof, said cylindrical bores extending generally transverse to the longitudinal axes of said semicircular grooves formed in said top surface of said housing and adapted to receive first and second movable work table tubular supporting pedestals; and
  (b) manually operable means disposed in said housing and cooperating with one of said cylindrical bores for engaging one of said first or second movable work table tubular supporting pedestals for controlling the elevation of said movable work table relative to said fixed work table member.

6. Apparatus as in claim 1 wherein said power head member comprises:
  (a) housing means;
  (b) variable speed motor means disposed within said housing means;
  (c) a tubular spindle rotatably journaled in said housing and extending generally parallel to said tubular ways;
  (d) quill means for moving said spindle longitudinally within said housing;
  (e) means coupling said motor means to said spindle in a driving relationship; and
  (f) a tool supporting chuck affixed to said spindle.

7. Apparatus as in claim 6 and further including:
  (a) a draw rod member adapted to pass through said tubular spindle for affixing said tool supporting chuck to said spindle.

* * * * *